(12) United States Patent
Tohyama (10) Patent No.: US 9,513,679 B2
(45) Date of Patent: Dec. 6, 2016

(54) ELECTRONIC CONTROL UNIT (71) Applicant: DENSO CORPORATION, Kariya, Aichi-pref. (JP)

(72) Inventor: Naohiro Tohyama, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 14/630,703

(22) Filed: Feb. 25, 2015

(65) Prior Publication Data

US 2015/0278001 A1 Oct. 1, 2015

(30) Foreign Application Priority Data

Mar. 26, 2014 (JP) .................................. 2014-63700

(51) Int. Cl.
G06F 11/00 (2006.01)
G06F 1/24 (2006.01)
G06F 11/07 (2006.01)

(52) U.S. Cl.
CPC .............. *G06F 1/24* (2013.01); *G06F 11/0739* (2013.01); *G06F 11/0757* (2013.01)

(58) Field of Classification Search
CPC ....... G06F 11/079; G06F 11/008; G06F 11/22; G06F 11/36
See application file for complete search history.

(56) References Cited

U.S. PATENT DOCUMENTS

| 5,113,504 | A | * | 5/1992 | Matsuda | ............ | G05B 19/0428 714/23 |
| 6,618,666 | B2 | * | 9/2003 | Amano | ................. | F02D 41/042 701/102 |
| 6,883,123 | B2 | * | 4/2005 | Hashimoto | ......... | G06F 11/0721 714/23 |
| 7,251,551 | B2 | * | 7/2007 | Mitsueda | .......... | B60W 50/0205 700/2 |

(Continued)

FOREIGN PATENT DOCUMENTS

| JP | H05-204720 A | 8/1993 |
| JP | H05-303516 A | 11/1993 |

(Continued)

*Primary Examiner* — Amine Riad
(74) *Attorney, Agent, or Firm* — Posz Law Group, PLC (57) ABSTRACT

An electronic control unit includes a microcomputer and a monitoring section. The monitoring section monitors an operation of the microcomputer and outputs a reset signal to the microcomputer when determining that an abnormality occurs in the microcomputer. The microcomputer includes an acquisition section, a determination section, and a time calculation section. The acquisition section acquires time information from outside the microcomputer. When the microcomputer starts up, the determination section determines whether the microcomputer stopped the operation due to unknown cause. When the determination section determines that the microcomputer stopped the operation due to unknown cause, the time calculation section calculates stop time information based on the time information acquired by the acquisition section before the microcomputer stopped (Continued)

the operation and the time information acquired by the acquisition section after the microcomputer starts up, and stores the stop time information in a time storage portion.

3 Claims, 5 Drawing Sheets

(56) References Cited

U.S. PATENT DOCUMENTS

| | | | | |
|---|---|---|---|---|
| 7,496,800 | B2* | 2/2009 | Koto | G06F 11/0757 |
| | | | | 714/51 |
| 7,996,732 | B2* | 8/2011 | Nishimura | G06F 9/4812 |
| | | | | 714/25 |
| 8,281,167 | B2* | 10/2012 | Nakamura | B60W 50/04 |
| | | | | 180/65.1 |
| 2008/0148107 | A1 | 6/2008 | Takaishi et al. | |
| 2010/0305805 | A1* | 12/2010 | Yamaguchi | F02N 11/0822 |
| | | | | 701/31.4 |
| 2012/0084546 | A1 | 4/2012 | Ogasawara et al. | |

FOREIGN PATENT DOCUMENTS

| | | |
|---|---|---|
| JP | 2002-323902 A | 11/2002 |
| JP | 2006-323494 A | 11/2006 |
| JP | 2009-087276 A | 4/2009 |
| JP | 2012-118589 A | 6/2012 |

* cited by examiner

ELECTRONIC CONTROL UNIT

CROSS REFERENCE TO RELATED APPLICATIONS

The present application is based on and claims priority to Japanese Patent Application No. 2014-63700 filed on Mar. 26, 2014, the disclosure of which is incorporated herein by reference.

TECHNICAL FIELD

The present disclosure relates to an electronic control unit including a microcomputer.

BACKGROUND

In general, an electronic control unit including a microcomputer further includes a monitoring circuit that monitors operation of the microcomputer. When the monitoring circuit determines that the microcomputer has an abnormality, the monitoring circuit outputs a reset signal to the microcomputer so as to correctly recover the microcomputer (see, for example, JP 2008-152678 A corresponding to US 2008/0148107 A1).

The inventor of the present disclosure has considered a microcomputer that has a function of detecting an internal abnormality such as a task omission due to a high processing load and a program counter abnormality, and a function of storing an error code indicating a content of the abnormality in a memory when the internal abnormality is detected and then being reset intentionally. Accordingly, for example, when an abnormality occurs in functions of the electronic control unit, a cause of the abnormality (i.e., a cause of resetting the microcomputer) can be specified by reading out the error code from the memory.

However, some causes resetting the microcomputer, such as a noise mixing to a reset signal line and an abnormality of an oscillator for generating an operation clock of the microcomputer, cannot be recognized by the microcomputer. Thus, in a case where the microcomputer is reset due to a unknown cause, the microcomputer suddenly stops operation without knowing the cause and cannot store the error code. Thus, in the above-described case, the cause of resetting the microcomputer cannot be analyzed.

SUMMARY

It is an object of the present disclosure to provide an electronic control unit that can obtain information useful for analyzing a cause of resetting the microcomputer.

An electronic control unit according to an aspect of the present disclosure includes a microcomputer and a monitoring section. The monitoring section monitors an operation of the microcomputer and outputs a reset signal to the microcomputer when the monitoring section determines that an abnormality occurs in the microcomputer. The microcomputer includes an acquisition section, a determination section, and a time calculation section.

The acquisition section acquires time information from outside the microcomputer. When the microcomputer starts up, the determination section determines whether the microcomputer stopped the operation due to unknown cause. When the determination section determines that the microcomputer stopped the operation due to unknown cause, the time calculation section calculates stop time information that indicates a time during which the microcomputer stopped the operation based on the time information acquired by the acquisition section before the microcomputer stopped the operation and the time information acquired by the acquisition section after the microcomputer starts up, and stores the stop time information in a time storage portion.

In the electronic control unit, when the microcomputer is reset due to unknown cause and then starts up, the stop time information indicating the time during which the microcomputer stopped the operation (hereafter, referred to as an operation stop time) is stored in the time storage portion. Because the operation stop time due to a reset depends on a cause of the reset, the cause of resetting the microcomputer can be analyzed from the operation stop time stored in the time storage portion.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Electronic control units (ECUs) according to exemplary embodiments of the present disclosure will be described with reference to the drawings. Each of the ECUs is equipped, for example, in a vehicle to control a controlled object such as an engine.

(First Embodiment)

Figure 1:
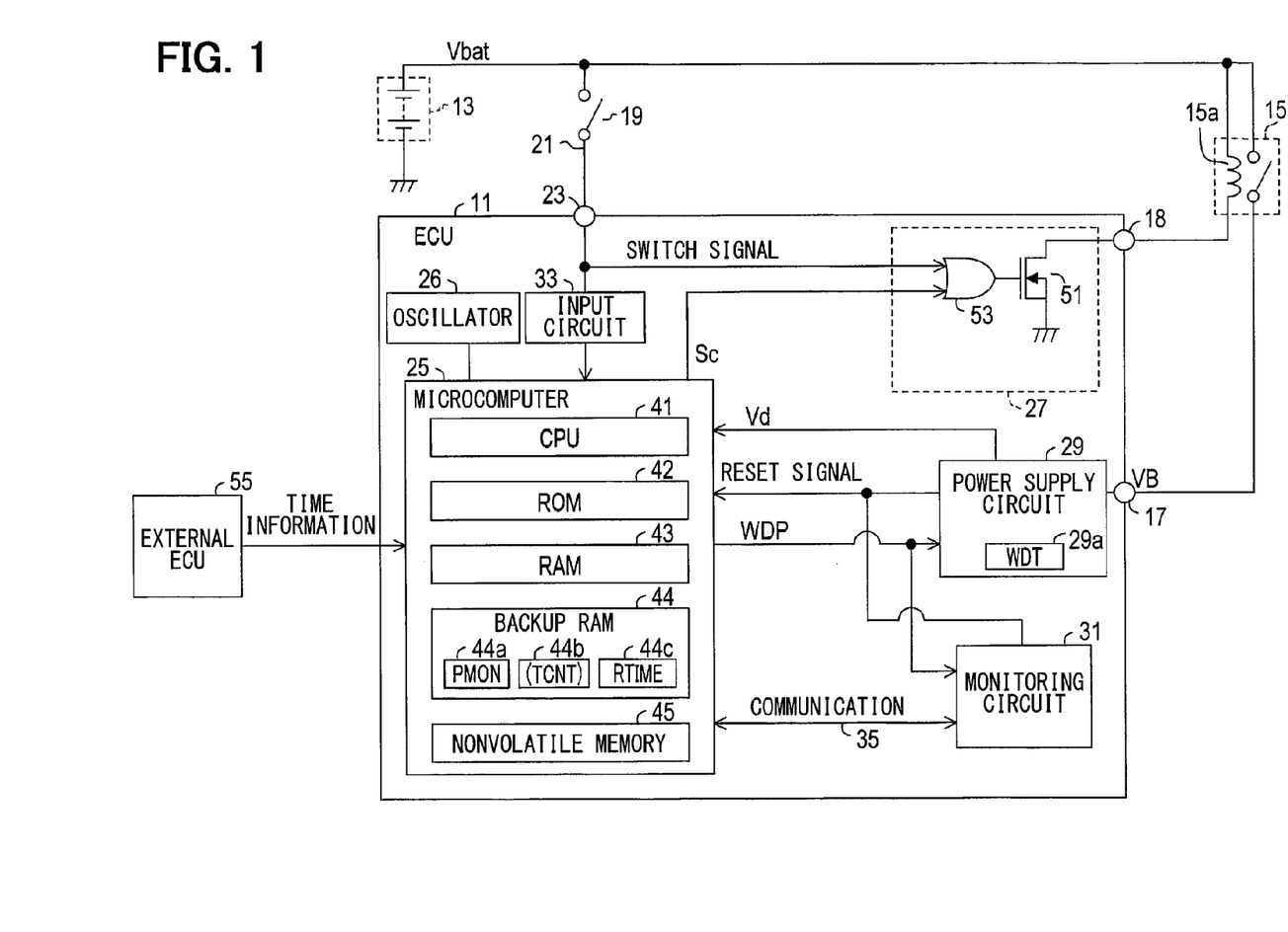
FIG. 1 is a diagram illustrating an ECU according to a first embodiment.

As illustrated in FIG. 1, an ECU 11 according to a first embodiment includes a terminal 17 as a feeding portion. A battery voltage Vbat of a battery 13 of a vehicle (generally about 12 V) is supplied as a power supply voltage VB to the terminal 17 through a main relay 15 as a power supply relay. The main relay 15 includes a coil 15a. The battery voltage Vbat is supplied to one end of the coil 15a.

The ECU 11 further includes a terminal 18 and a terminal 23. The terminal 18 is connected with a downstream side of the coil 15a of the main relay 15 (i.e., a side opposite to a side supplied with the battery voltage Vbat). When a power supply switch 19 is turned on, a voltage of a power supply line 21 through which the battery voltage Vbat is supplied is input to the terminal 23 as a switch signal that indicates an on and off state of the power supply switch 19. In the present embodiment, the power supply switch 19 is, for example, an ignition switch of the vehicle.

The ECU 11 further includes a microcomputer 25, an oscillator 26, a main relay driving circuit 27, a power supply circuit 29, a monitoring circuit 31, and an input circuit 33. The microcomputer 25 manages operation of the ECU 11. The oscillator 26 generates an operation clock of the microcomputer 25. The main relay driving circuit 27 turns on and off the main relay 15. The power supply circuit 29 has a function of monitoring the operation of the microcomputer 25. The monitoring circuit 31 monitors the operation of the microcomputer 25.

The power supply circuit 29 generates a fixed power supply voltage Vd (e.g., 5 V in the present embodiment) for operating the microcomputer 25 from the power supply voltage VB supplied to the terminal 17, and outputs the power supply voltage Vd to the microcomputer 25. The power supply voltage Vd is also supplied as a power to the main relay driving circuit 27 and other circuits in the ECU 11.

In addition, the power supply circuit 29 receives a watch dog pulse (hereafter, referred to as WDP) that periodically inverts a level when the microcomputer 25 normally operates. The power supply circuit 29 includes a watch dog timer (WDT) 20a that is cleared by a level change edge of the WDP. The watch dog timer 29a overflows when a time during which the WDP is not output from the microcomputer 25 (i.e., a time during which the level of the WDP does not change) becomes equal to or longer than a specified time T1. When the watch dog timer 29a overflows, the power supply circuit 29 determines that an abnormality occurs in the microcomputer 25, and outputs a reset signal to the microcomputer 25. For example, the microcomputer 25 inverts the output level of the WDP between high and low every 4 ms. The specified time T1 is longer than 4 ms, and is set to, for example, 40 ms. In the present embodiment, the reset signal is, for example, a low active signal.

The power supply circuit 29 also has a so-called power on reset function, and outputs a reset signal to the microcomputer 25 for a predetermined time during which the power supply voltage Vd is expected to increase from 0 V and reach a normal range (e.g., 4.5 V to 5.5 V).

The monitoring circuit 31 communicates with the microcomputer 25 through a communication line 35. When a duration time during which the monitoring circuit 31 cannot receive a correct data (including a time during which the monitoring circuit 31 receives no data) becomes equal to or longer than a specified time T2, the monitoring circuit 31 determines that an abnormality occurs in the microcomputer 25 and outputs a reset signal to the microcomputer 25. In the present signal, the reset signal from the monitoring circuit 31 and the reset signal from the power supply circuit 29 are input to a reset terminal (not illustrated) of the microcomputer 25 through a wired-OR connection. The specified time T2 is longer than the specified time T1 of the power supply circuit 29 and is, for example, 100 ms.

The WDP from the microcomputer 25 is also input to the monitoring circuit 31. The monitoring circuit 31 stores a history whether the WDP is correctly output. For example, the monitoring circuit 31 monitors whether the WDP is output while measuring the duration time for which the monitoring circuit 31 cannot receive the correct data from the microcomputer 25, and when the reset signal is output, the monitoring circuit 31 stores a monitoring result of the WDP in a nonvolatile memory in the monitoring circuit 31. When a time during which the WDP is not output from the microcomputer 25 becomes equal to or longer than the specified time, the monitoring circuit 31 may determine that an abnormality occurs in the microcomputer 25 and may output the reset signal to the microcomputer 25, in a manner similar to the power supply circuit 29. Accordingly, the monitoring of the microcomputer 25 with the WDP is doubled, and the reliability can be improved.

The input circuit 33 converts the switch signal input from the terminal 23 (i.e., a signal having a high level at the battery voltage Vbat and having a low level at 0 V) into a signal the microcomputer 25 can receive (i.e., a signal having a high level at the power supply voltage Vd and having a low level at 0 V), and outputs the converted signal to the microcomputer 25.

The microcomputer 25 includes a CPU 41, a ROM 42, a RAM 43, a backup RAM 44, and a nonvolatile memory 45. The CPU 41 executes a program. The ROM 42 stores the program executed by the CPU 41 and a fixed data. The RAM 43 stores, for example, a calculated result of the CPU 41. The backup RAM 44 is constantly supplied with power. The nonvolatile memory is data rewritable and is, for example, a flash memory or an EEPROM. The backup RAM 44 can hold data even when the power supply voltage Vd is not supplied to the microcomputer 25. Thus, the backup RAM 44 can be said as a nonvolatile memory similar to the nonvolatile memory 45. The backup RAM 44 holds the data (i.e., the data is not cleared) even when the microcomputer 25 is reset and is similar to the nonvolatile memory 45 also in this respect.

The main relay driving circuit 27 includes a transistor 51 and an OR circuit 53. When the transistor 51 is turned on, the transistor 51 electrically connects the terminal 18 with a ground line so that electric current flows to the coil 15a. The OR circuit 53 outputs an OR signal of the switch signal input from the terminal 23 and a high active power supply control signal Sc output from the microcomputer 25 to the transistor 51 as a driving signal. When an output level of the OR circuit 53 is high, the transistor 51 is turned on. Even when the power supply voltage Vd is not output from the power supply circuit 29, that is, even when the main relay 15 is off, the OR circuit 53 turns on the transistor 51 when the switch signal becomes high (=Vbat). When the transistor 51 is turned on, the electric current flows to the coil 15a and the main relay 15 is turned on.

Thus, the main relay driving circuit 27 turns on the main relay 15 when the switch signal is high, that is, when the power supply switch 19 is on, or when the power supply control signal Sc from the microcomputer 25 is high.

Thus, when the power supply switch 19 is turned on by a user of the vehicle and the switch signal becomes high, the main relay 15 is turned on, and the power supply voltage VB is supplied to the terminal 17 of the ECU 11. As a result, the power supply voltage Vd is supplied from the power supply circuit 29 to the microcomputer 25, and the microcomputer 25 starts up.

When the microcomputer 25 starts up, the microcomputer 25 controls the power supply control signal Sc to be high. Thus, even when the power supply switch 19 is turned off thereafter, the main relay 15 remains the on-state. After that, when the microcomputer 25 detects that the power supply switch 19 is turned off based on the switch signal input through the input circuit 33, the microcomputer 25 executes a processing to be performed after the power supply switch 19 is turned off and changes the power supply control signal Sc from high to low after finishing the processing. Because the switch signal is low at the point, the main relay 15 is turned off and the microcomputer 25 stops the operation. The above-described stop of the operation of the microcomputer 25 is a normal stop (normal ending) of the operation.

The ECU 11 receives time information from an external ECU 55, and the time information is input to the microcomputer 25. For example, the external ECU 55 is a navigation device. As the time information, a counter value that is counted up every predetermined time is input to the microcomputer 25. As the counter value, for example, a value of a free run timer of a microcomputer included in the external ECU 55 can be used. In another example, as the time information input from the external ECU 55 to the microcomputer 25, information of absolute time may be used.

Next, the processing executed by the microcomputer 25 will be described with reference to FIG. 2 and FIG. 3. The microcomputer 25 executes the processing by controlling the CPU 41 to execute the programs stored in the ROM 42.

Figure 2:
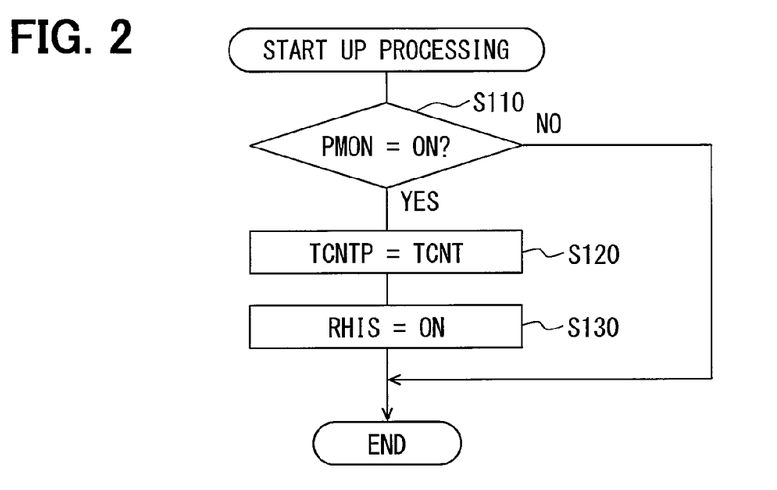
FIG. 2 is a flowchart illustrating a start-up processing of the ECU according to the first embodiment.

When the microcomputer 25 starts up by release of a reset, the microcomputer 25 executes a start-up processing illustrated in FIG. 2. As illustrated in FIG. 2, when the microcomputer 25 starts the start-up processing, firstly at S110, the microcomputer 25 determines whether a PMON stored in a predetermined storage region 44a (see FIG. 1) in the backup RAM 44 is on.

The PMON is a flag as history information indicating an on or off state of the power supply switch 19 at a time when the microcomputer 25 stopped the last operation. At S220 or S230 in FIG. 3, which will be described later, the PMON is set to be on or off. For example, a state where the PMON is "1" means that the PMON is on and the power supply switch 19 is on, and a state where the PMON is "0" means that the PMON is off and the power supply switch 19 is off.

A state where the PMON is off when the microcomputer 25 starts up means that the power supply switch 19 was off when the microcomputer 25 stopped the last operation, that is, the microcomputer 25 normally stopped (normally ended) the operation in association with turning off of the power supply switch 19.

On the other hand, a state where the PMON is on when the microcomputer 25 starts up means that the power supply switch 19 was on when the microcomputer 25 stopped the last operation, that is, the microcomputer 25 stopped the operation when the power supply switch 19 is on. In other words, the microcomputer 25 was unexpectedly reset due to unknown cause (i.e., a cause not known by the microcomputer 25).

Based on the above-described points, when the microcomputer 25 determines at S110 that the PMON is not on, that is, the PMON is off, the microcomputer 25 ends the star-up processing. On the other hand, when the microcomputer 25 determines at S110 that the PMON is on, the microcomputer 25 determines that operation of the microcomputer stops due to unknown cause and proceeds to S120.

At S120, the microcomputer 25 copies and evacuates a value stored in a TCNT as a predetermined storage region 44b (see FIG. 1) in the backup RAM 44 to, for example, the RAM 43 or a TCNTP as a predetermined storage region in the backup RAM 44.

In the last operation of the microcomputer 25, time information from the external ECU 55 is periodically updated and stored in the TCNT. Thus, when the microcomputer 25 starts up, the last time information acquired from the external ECU 55 before the microcomputer stopped the last operation is stored in the TCNT, and the time information when the microcomputer 25 stopped the last operation is evacuated to the TCNTP by the processing at S120. The updating and storing of the time information in the TCNT is performed at S240 in FIG. 3.

Then, at S130, the microcomputer 25 turns on an RHIS that is a flag, for example, in the RAM 43, and then ends the start-up processing. The RHIS is a flag as a reset history that indicates whether the microcomputer 25 was reset during operation. A state where the RHIS is on means that the microcomputer 25 was reset. For example, a state where the RHIS is "1" means that the RHIS is on, and a state where the RHIS is "0" means that the RHIS is off.

Although it is not illustrated in FIG. 2, as described above, when the microcomputer 25 starts up, the microcomputer 25 changes the power supply control signal Sc to the main relay driving circuit 27 into high. After the microcomputer 25 ends the start-up processing, the microcomputer 25 executes a periodic processing illustrated in FIG. 3 every fixed time.

Figure 3:
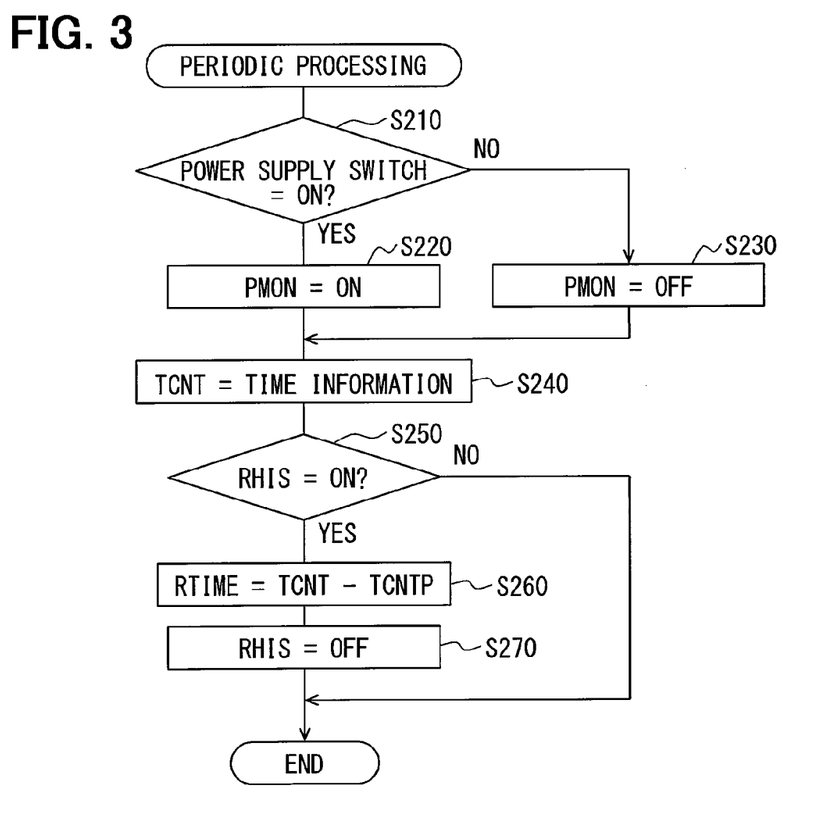
FIG. 3 is a flowchart illustrating a periodic processing of the ECU according to the first embodiment.

As illustrated in FIG. 3, when the microcomputer 25 starts the periodic processing, firstly at S210, the microcomputer 25 determines whether the power supply switch 19 is on. The on or off state of the power supply switch 19 can be determined based on the switch signal.

When the microcomputer 25 determines at S210 that the power supply switch 19 is on, the microcomputer 25 turns on the PMON at S220, and then proceeds to S240. On the other hand, when the microcomputer 25 determines at S210 that the power supply switch 19 is not on, that is, the power supply switch 19 is off, the microcomputer 25 turns off the PMON, and then proceeds to S240.

The processing from S210 to S230 is a processing in which the microcomputer 25 periodically determines whether the power supply switch 19 is on and stores the PMON as history information indicating the determination result in the storage region 44a. Because the processing from S210 to S230 is executed in the periodic processing, when the microcomputer 25 is reset with some cause while the power supply switch 19 is on, the PMON is on, which indicates that the power supply switch 19 is on, when the microcomputer 25 starts up next time. Thus, in the above-described start-up processing, the microcomputer 25 determines "YES" at S110 and the processing at S120 and S130 is executed.

At S240, the microcomputer 25 acquires the time information from the external ECU 55 and stores the time information in the TCNT (the storage region 44b). Because the processing at S240 is executed in the periodic processing, while the microcomputer 25 operates, the time information from the external ECU 55 is updated and stored every fixed time.

At S250, the microcomputer 25 determines whether the RHIS that is the flag as the reset history is on, that is, whether the microcomputer 25 determines "YES" at S110 in FIG. 2.

Then, when the microcomputer 25 determines at S250 that the RHIS is not on, that is the RHIS is off, the microcomputer 25 ends the periodic processing. On the other hand, when the microcomputer 25 determines at S250 that the RHIS is on, the microcomputer 25 proceeds to S260.

At S260, the microcomputer 25 calculates an RTIME as stop time information that indicates a stop time of the operation of the microcomputer 25 based on the time information stored in the TCNT (i.e., the time information acquired at S240 in the first time after the microcomputer 25 starts up this time), and the time information stored in the TCNTP (i.e., the last time information acquired at S240 before the microcomputer 25 stopped the last operation. Specifically, the microcomputer 25 calculates a value obtained by subtracting the time information stored in the TCNTP from the time information stored in the TCNT as the RTIME. In addition, the microcomputer 25 writes the calculated RTIME, for example, into a predetermined storage region 44c (see FIG. 1) in the backup RAM 44.

As described above, in the present embodiment, the time information from the external ECU 55 is a counter value that is counted up every fixed time Tc. Thus, the RTIME calculated at S260 is a value obtained by dividing the operation stop time of the microcomputer 25 by the fixed time Tc. On the other hand, for example, in a case where the time information from the external ECU 55 is information of the absolute time, the RTIME calculated at S260 indicates the operation stop time of the microcomputer 25 as it is.

At S270, the microcomputer 25 turns off the RHIS and ends the periodic processing. In a case where the microcomputer 25 executes the processing at S230, after ending the periodic processing at the time, the microcomputer 25 executes a processing to be executed after turning off the power switch 10, and then changes the power supply control signal Sc from high to low. Then, the main relay 15 is turned off, and consequently the microcomputer 25 stops the operation. The processing to be executed after turning off the power switch 10 include, for example, a data storing processing of copying and evacuating a predetermined data stored in the RAM 43 and the backup RAM 44 to the nonvolatile memory 45. By the data storing processing, for example, the RTIME is stored also in the nonvolatile memory 45.

Although it is not illustrated in FIG. 3, the microcomputer 25 executes a processing of outputting a WDP in the periodic processing in FIG. 3. Specifically, the microcomputer 25 inverts a level of the WDP. In another example, the processing of outputting the WDP may be performed in a periodic processing other than the periodic processing in FIG. 3.

Figure 4:
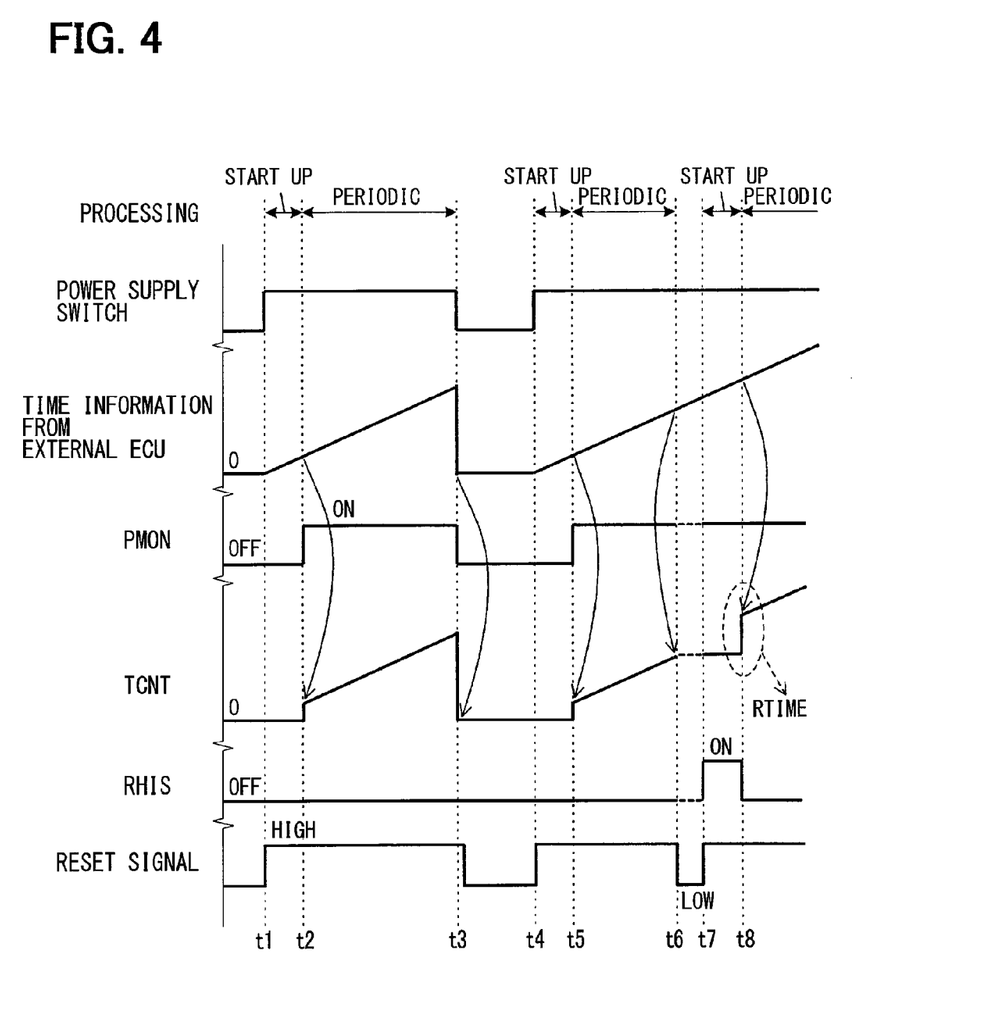
FIG. 4 is a diagram for explaining an operation of the ECU according to the first embodiment.

Next, an example of the operation of the ECU 11 will be described with reference to FIG. 4. In FIG. 4, it is illustrated in such a manner that the reset signal immediately changes from low to high when the power supply switch 19 is turned from off to on. However, actually, due to a power on reset function of the power supply circuit 29, the reset signal remains low for a predetermined time after the power supply switch 10 is turned on and changes to high after the predetermined time elapses. In the uppermost stage in FIG. 4, a period of an arrow indicated as "START UP" is a period in which the start-up processing in FIG. 2 is executed, and a period of an arrow indicated as "PERIODIC" is a period in which the periodic processing in FIG. 3 is executed every fixed time. In the example in FIG. 4, the PMON is off at time t1. In other words, the microcomputer 25 starting an operation before time t1 normally ended the operation after executing the processing at S230 in FIG. 3. In addition, in the example in FIG. 4, every time the power supply switch 19 is turned off, the time information from the external ECU 55 is initialized to 0. However, the time information from the external ECU 55 may be increased also when the power supply switch 10 is off.

As illustrated in FIG. 4, when the power supply switch 19 is turned on at time t1, the microcomputer 25 starts up and executes the start-up processing. The microcomputer 25 determines that the PMON is not on (S110: NO) in this start-up processing.

Then, at time t2, in the first periodic processing after starting up, the microcomputer 25 determines that the power supply switch 19 is on (S210: YES), turns on the PMON (S220), and updates and stores the time information from the external ECU 55 in the TCNT (S240). At this time, the time information of the external ECU 55 corresponds with the time information in the TCNT.

While the power supply switch 19 is on, the microcomputer 25 updates and stores the time information from the external ECU 55 in the TCNT every time the microcomputer 25 executes the periodic processing (S240). After that, when the power supply switch 19 is turned off at time t3, the microcomputer 25 determines that the power supply switch 19 is off (S210: NO), and turns off the PMON (S230). Also in this case, the microcomputer 25 updates and stores the time information from the external ECU in the TCNT (S240). In the example illustrated in FIG. 4, when the power supply switch 19 is turned off, the time information from the external ECU 55 is initialized to 0. Thus, by the processing at S240 after the power supply switch 19 is turned off, the time information in the TCNT becomes 0.

Then, the microcomputer 25 executes the processing to be executed after the power supply switch 19 is turned off, and stops the operation by changing the power supply control signal Sc into low. After that, when the power supply switch 19 is turned on again at time t4, the microcomputer 25 starts up and executes the start-up processing, and the microcomputer 25 determines that the PMON is not on (S110: NO) in the start-up processing.

Then, as illustrated at time t5, in the first periodic processing after starting up, the microcomputer 25 determines that the power supply switch 19 is on (S210: YES), turns on the PMON (S220), and updates and stores the time information from the external ECU 55 in the TCNT (S240). At the time, the time information of the external ECU 55 and the time information in the TCNT correspond to each other again. Then, while the power supply switch 19 is on, the microcomputer 25 updates and stores the time information from the external ECU 55 in the TCNT (S240) every time the microcomputer 25 executes the periodic processing.

In a period from time t6 to time t7, while the power supply switch 19 is on, the reset signal to the microcomputer 25 is changed to an active level (low in this example) by some cause, and the microcomputer 25 is reset. In the TCNT, the last time information acquired from the external ECU 55 before time t6, at which the microcomputer 25 stops the operation, is stored.

When the reset signal returns from low to high at time t7, the microcomputer 25 starts up. In the start-up processing at the time, the microcomputer 25 determines that the PMON is on (S110: YES), copies the time information stored in the TCNT into the TCNTP (S120), and turns on the RHIS (S130).

When the microcomputer 25 executes the first periodic processing after starting up at time t8, the microcomputer 25 updates and stores the time information from the external ECU 55 in the TCNT (S240). However, in this case, the microcomputer 25 determines that the RHIS is on (S250: YES) and executes the processing at S260. In other words, the microcomputer 25 calculates the RTIME by subtracting the time information copied into the TCNTP at S120 in the start-up processing from the time information in the TCNT acquired from the external ECU 55 at S240 in this periodic processing, and stores the calculated RTIME in the storage region 44c. Then, the microcomputer 25 turns off the RHIS (S270).

In the ECU 11, when the microcomputer 25 is reset by an unknown cause (i.e., a cause determined as "YES" at S110 in the start-up processing) and then the microcomputer 25 starts up, the RTIME as the stop time information that indicates the operation stop time of the microcomputer 25 is stored in the storage region 44c.

Thus, the operation stop time by resetting the microcomputer 25 can be known from the RTIME stored in the storage region 44c, and a cause of resetting the microcomputer 25 can be analyzed from the operation stop time because the operation stop time by the reset of the microcomputer 25 changes with the cause of the reset (i.e., the content of the abnormality).

For example, in a case where a noise mixes to the reset signal line to the microcomputer 25 and the microcomputer 25 is reset, the operation stop time of the microcomputer 25 is substantially equal to a start-up time of the microcomputer 25. The start-up time of the microcomputer 25 is a time from when the reset of the microcomputer 25 is released (i.e., when the reset signal becomes high) to when the microcomputer 25 normally executes a processing such as the periodic processing. For example, the start-up time of the microcomputer 25 is 10 ms.

In a case where a temporary abnormality occurs in the oscillator 26, the microcomputer 25 stops the operation, the WDP from the microcomputer 25 is not output, and thereby the microcomputer 25 is reset by the power supply circuit 29, the operation stop time of the microcomputer 25 is substantially equal to the sum of the specified time T1 (e.g., 40 ms) and the start-up time of the microcomputer 25. In this case, the reset time by the power supply circuit 29 (a time for changing the reset signal into low, e.g., a few ms) is ignored.

In a case where an abnormality occurs in the communication line 35, the communication data from the microcomputer 25 is not input to the monitoring circuit 31, and thereby the microcomputer 25 is reset by the monitoring circuit 31, the operation stop time of the microcomputer 25 is substantially equal to the sum of the specified time T2 (e.g., 100 ms) and the start-up time of the microcomputer 25. In this case, the reset time by the monitoring circuit 31 (e.g., a few ms) is ignored.

As described above, if the operation stop time of the microcomputer 25 is known from the RTIME, the cause of the reset, that is, a circuit that resets the microcomputer 25 or a part that has an abnormality and resets the microcomputer 25 can be analyzed. In addition, it can be determined that whether the reset of the microcomputer 25 is a single reset or a consecutive reset.

The single reset is a reset in which the microcomputer 25 is reset once, and then normally returns after the reset is released. When the signal reset occurs, the operation stop time of the microcomputer 25 changes with the content of the abnormality.

The consecutive reset is a plurality of resets in which a state where the power supply circuit 29 or the monitoring circuit 31 determines that an abnormality occurs in the microcomputer 25 and resets the microcomputer 25, and nevertheless the microcomputer 25 does not normally return and the power supply circuit 29 or the monitoring circuit 31 resets the microcomputer 25 again is repeated. When the consecutive reset occurs, the microcomputer 25 continuously stops the operation from when the abnormality occurs to when the microcomputer 25 normally returns by a reset for a plurality of times. Thus, the operation stop time is especially longer than the operation stop time in a case where the signal reset occurs.

The RTIME stored in the storage region 44c is also stored in the nonvolatile memory 45, for example, by the above-described data storing processing. Thus, the RTIME can also be read out from the nonvolatile memory 45. If a diagnosis tool as an external device is connected to the ECU 11 through a communication line so as to read out the data from the backup RAM 44 or the nonvolatile memory 45, the RTIME calculated by the microcomputer 25 can be easily read out to outside the ECU 11.

The storage region 44c may be configured to store a plurality of RTIMEs or may be configured to store only one RTIME. In a case where the storage region 44c is configured to store a plurality of RTIMEs, at S260 in the periodic processing, the calculated RTIME may be written in a vacant region in the storage region 44c or if there is no vacant region, the calculated RTIME may be overwritten in the oldest RTIME. In a case where the storage region 44c is configured to store only one RTIME, at S250 in the periodic processing, if the processing is the second time or later, the RTIME is overwritten.

In the ECU 11, the microcomputer 25 is supplied with the power supply voltage Vd and starts up when the power supply switch 19 is turned on, and the microcomputer 25 stops the operation when detecting that the power supply switch 19 is turned off. The microcomputer 25 periodically determines whether the power supply switch 19 is on or off by the periodic processing and stores the PMON indicating the determination result in the storage region 44a (S210 to S230). Furthermore, by the start-up processing, the microcomputer 25 determines whether the PMON in the storage region 44a indicates that the power supply switch 19 is on. If the PMON indicates that the power supply switch 19 is on, the microcomputer 25 determines that the microcomputer 25 stopped the operation due to unknown cause (S110: YES) and calculates the RTIME in the case.

Thus, the microcomputer 25 can correctly determine that the microcomputer 25 is suddenly reset due to unknown cause. When the microcomputer 25 determines that a sudden reset occurs, the microcomputer 25 calculates and stores the RTIME.

The storage regions 44a, 44b have only to be regions that can hold the data even when the microcomputer 25 is reset. The storage regions 44a, 44b are not limited to the storage regions in the backup RAM 44 and may be storage regions in the nonvolatile memory 45. If the calculated RTIME stored in the storage region 44c is also stored in the nonvolatile memory 45, the storage region 44c in which the RTIME is written at S260 may be a storage region in the RAM 43. Alternatively, the storage region 44c in which the RTIME is written at S260 may be a storage region in the nonvolatile memory 45.

(Second Embodiment)

Next, an ECU 11 according to a second embodiment of the present disclosure will be described. Components and processing similar to those of the first embodiment are denoted by the same reference symbols as the first embodiment. The same is true for the later-described other embodiments.

Figure 5:
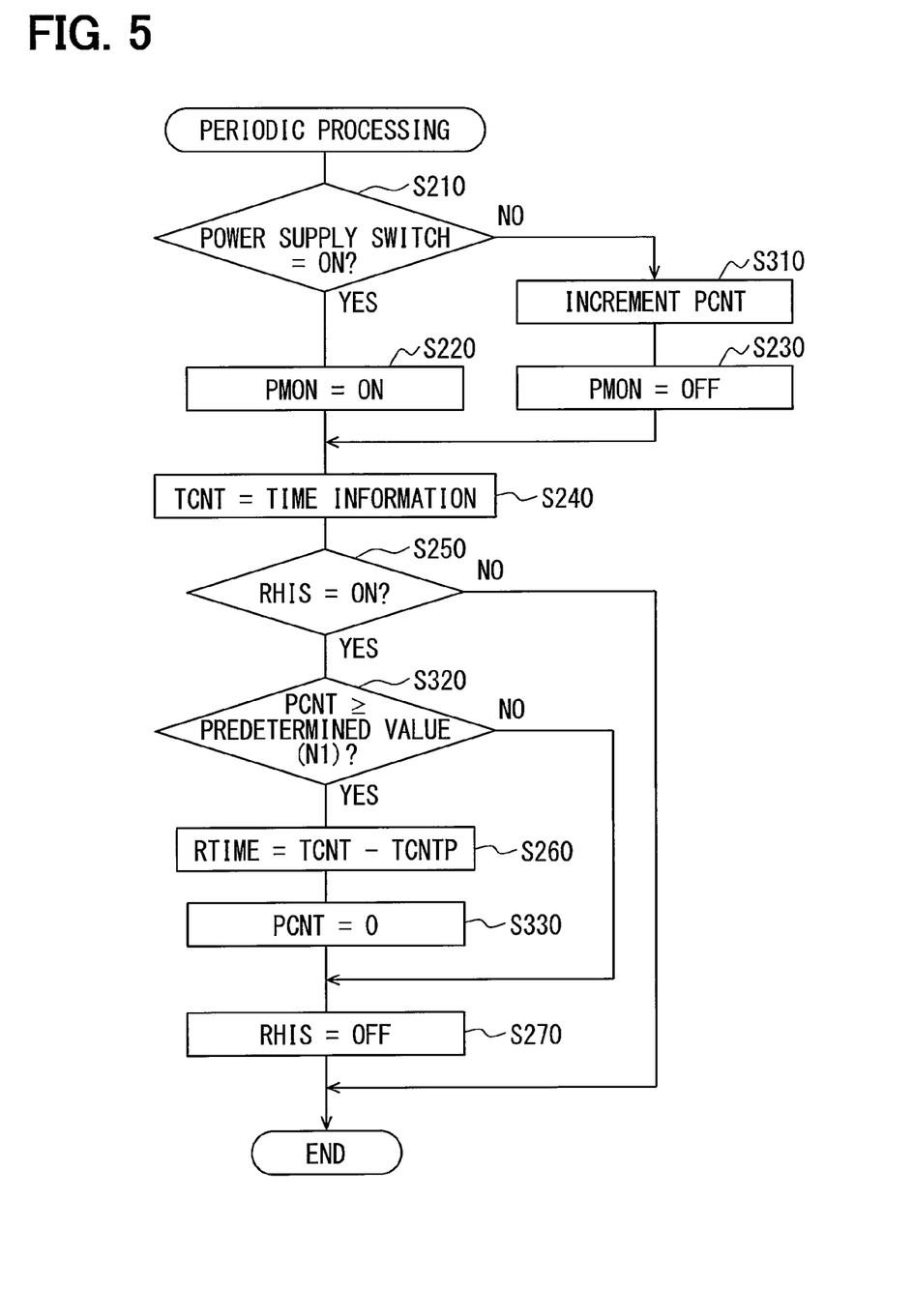
FIG. 5 is a flowchart illustrating a periodic processing of an ECU according to a second embodiment.

Compared with the ECU 11 according to the first embodiment, the ECU 11 according to the present embodiment executes a periodic processing in FIG. 5 instead of the periodic processing in FIG. 3. In the periodic processing in FIGS. 5, S310, S320, and S330 are added to the periodic processing in FIG. 3.

In the periodic processing in FIG. 5, when the microcomputer 25 determines at S210 that the power supply switch 19 is not on, that is, when the microcomputer 25 normally ended the operation in association with turning off of the power supply switch 19, the microcomputer 25 proceeds to S310. The microcomputer 25 increments a PCNT that is a counter of a memory, and proceeds to S230. The PCNT is a counter for measuring the number of times of the microcomputer 25 normally ending the operation. The PCNT is stored, for example, in the backup RAM 44 or the nonvolatile memory 45. An initial value of the PCNT is set to a value greater than a predetermined value N1 used for comparison at S320. For example, the initial value of the PCNT is set to be the maximum value of the PCNT. When the microcomputer 25 performs the increment at S310 in a state where the PCNT is the maximum value, the PCNT remains the maximum value.

When the microcomputer 25 determines at S250 that the RHIS is on, the microcomputer 25 proceeds to S320 to determine whether the PCNT is larger than the predetermined value N1 (e.g., 20). When the microcomputer 25 determines at S320 that the PCNT is equal to or greater than the predetermined value N1, the microcomputer 25 proceeds to S260 to calculate and store the RTIME. After that, the microcomputer 25 clears the PCNT to 0 at S330, then proceeds to S270 to turn off the RHIS, and ends the periodic processing.

On the other hand, when the microcomputer 25 determines at S320 that the PCNT is not equal to or greater than the predetermined value N1, the microcomputer 25 skips S260 and S330 and proceeds to S270. As described above, the initial value of the PCNT is greater than the predetermined value N1.

Thus, when the microcomputer 25 proceeds from S250 to S320 for the first time, the microcomputer 25 determines "YES" at S320 and executes the processing at S260. Then, when the microcomputer 25 calculates and stores the RTIME at S260, the microcomputer 25 clears the PCNT to 0 at S330. Thus, after that, until the PCT is incremented at S310 and becomes equal to or greater than the predetermined value N1, even when the microcomputer 25 determines as "YES" at S250, the microcomputer 25 determines "NO" at S320 and does not calculate the RTIME.

In other words, when the microcomputer 25 calculates and stores the RTIME at S260, the microcomputer 25 prohibits the processing at S260 until the number of times of the microcomputer 25 normally ending the operation becomes equal to or greater than the predetermined number of times (N1).

According to the second embodiment, in a case where a reset of the microcomputer 25 due to unknown cause frequently occurs, only the RTIME indicating the operation stop time by the first reset in the frequent resets (hereafter, referred to as the first RTIME) can be stored in the storage region 44c.

When resets occur frequently, a cause of a first reset is probably the same as or related to a cause of a second or later reset. Thus, the cause of the second or later reset can be probably estimated by analyzing and specifying or estimating the cause of the first reset. Thus, by storing only the first RTIME in the storage region 44c, a sufficient effect can be obtained while reducing a required capacity (resource) of the storage region 44c. Especially when the capacity of the storage region 44c is set to a capacity that can store only one RTIME, the first RTIME can be held without being overwritten. Even when the capacity of the storage region 44c is a capacity that can store n RTIMEs (n is an integer number equal to or greater than 2), a similar effect can be obtained. In other words, even when resets over n times occur, the first RTIME can be held without being overwritten.

When the number of times of the microcomputer 25 normally ending the operation becomes the predetermined number of times (N1), the prohibition of calculating and storing the RTIME is released. Thus, if a reset of the microcomputer 25 due to unknown cause occurs after that, the RTIME indicating the operation stop time by the reset is calculated again and is stored in the storage region 44c. Thus, the latest RTIME after continuation of normal state can be stored in the storage region 44c. If the RTIME already stored in the storage region 44c is overwritten by the latest RTIME, because the latest RTIME indicates the operation stop time by an abnormality after the normal state continues, the latest RTIME is more important in view of abnormality analysis.

(Third Embodiment)

An ECU 11 according to a third embodiment of the present disclosure will be described below. The ECU 11 according to the present embodiment is different from the ECU 11 according to the second embodiment in that the microcomputer 25 executes a periodic processing in FIG. 6 instead of the periodic processing in FIG. 5.

Figure 6:
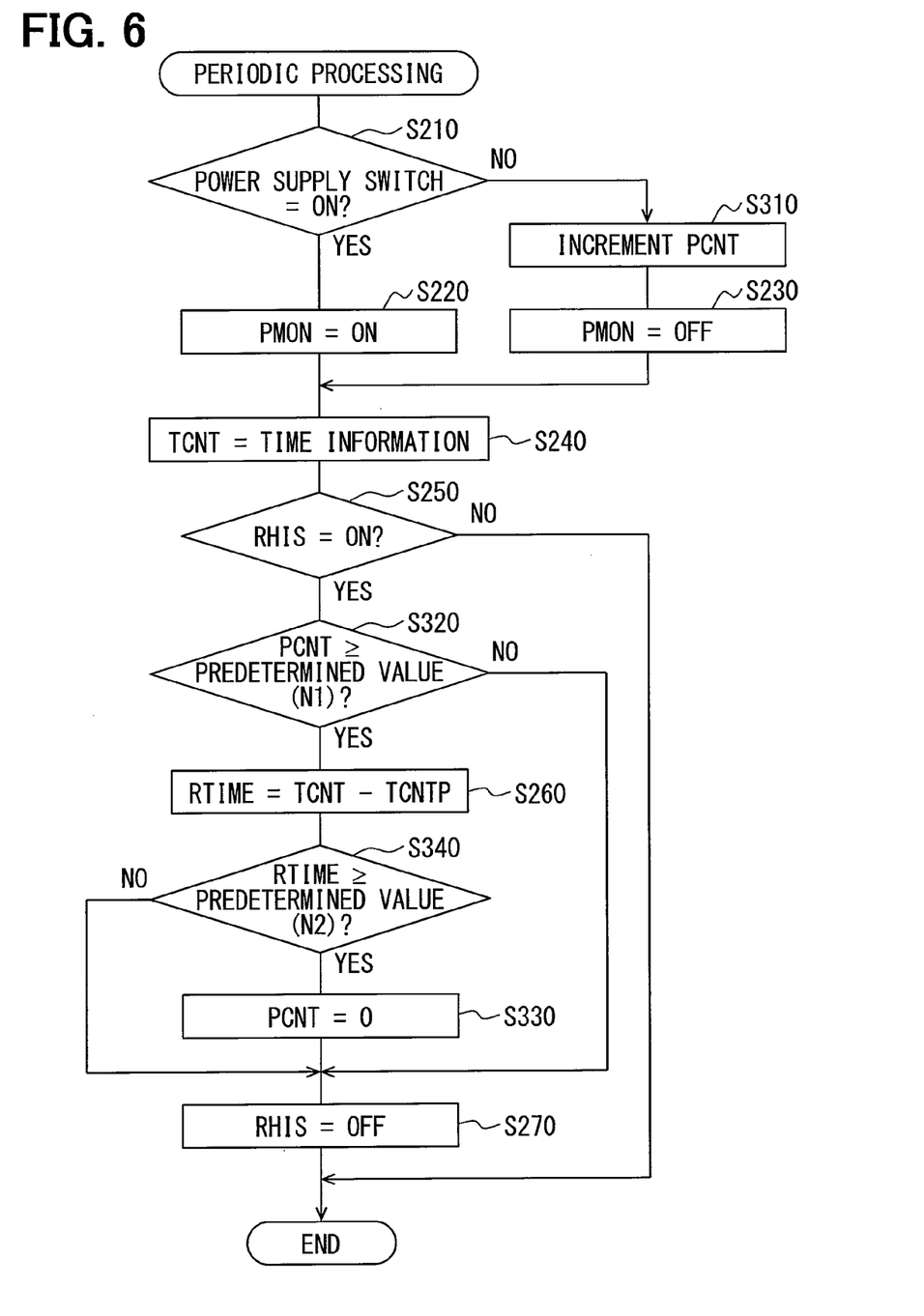
FIG. 6 is a flowchart illustrating a periodic processing of an ECU according to a third embodiment.

In the periodic processing in FIG. 6, S340 is added to the periodic processing in FIG. 5. In the periodic processing in FIG. 6, after the microcomputer 25 calculates and stores the RTIME at S260, the microcomputer 25 proceeds to S340 to determine whether the RTIME calculated this time is equal to or less than a predetermined value N2. If the RTIME is equal to or less than the predetermined value N2, the microcomputer 25 proceeds to S330 to clear the PCNT to 0. On the other hand, if the RTIME is not equal to or less than the predetermined value N2, the microcomputer 25 skips S330 and proceeds to S270.

In other words, if the RTIME calculated at S260 is not equal to or less than the predetermined value N2 (S340: NO), the microcomputer 25 does not return the PCNT to 0 so as to invalidate a prohibition function that prohibits the processing at S260 until the number of times of the microcomputer 25 normally ending the operation becomes equal to or greater than the predetermined number of times (N1). Conversely, the microcomputer 25 validates the prohibition function only when the RTIME calculated at S260 is equal to or less than the predetermined value N2.

The predetermined value N2 is set to the maximum value of the RTIME in a case where a reset considered as the single reset occurs. According to the third embodiment, when the processing at S260 is executed because of occurring of the consecutive reset, the prohibition function is invalidated. Thus, if the single reset occurs after that, the RTIME related to the single reset (i.e., the RTIME indicating the operation stop time by the single reset) can be calculated and stored in the storage region 44c.

Thus, between the consecutive reset and the single reset, the RIME related to the single reset which is more effective for the abnormality analysis can be stored in the storage region 44c prior to the consecutive reset. When the single reset occurs, the operation stop time changes with the content of the abnormality. Thus, the cause of the reset (the content of the abnormality) can be analyzed from the RTIME. On the other hand, when the consecutive reset occurs, a duration of the abnormal state can be known from the RTIME. However, it is considered to be difficult to analyze the cause of the reset.

In each of the above-described embodiments, the power supply circuit 29 and the monitoring circuit 31 correspond to a monitoring section. In the CPU 41, a section executing the processing at S240 correspond to an acquisition section, a section executing the processing at S110 correspond to a determination section, a section executing the processing at S260 correspond to the time calculation section, a section executing the processing from S210 to S230 correspond to a history storage section, a section executing the processing from S310 to S330 correspond to a prohibition section, and a section executing the processing at S340 correspond to a prohibition invalidation section. The storage section 44c correspond to a time storage portion, and the storage section 44a corresponds to a history storage portion. Each of the acquisition section, the determination section, time calculation section, the history storage section, the prohibition section, and the prohibition invalidation section may be realized by either a hardware or a software.

Although the present disclosure has been fully described in connection with the exemplary embodiments thereof with reference to the accompanying drawings, it is to be noted that various changes and modifications will become apparent to those skilled in the art. The above-described values are examples and may be other values.

For example, as described above, the microcomputer 25 may have a first function of detecting the internal abnormality such as the task omission due to the high processing load and the program counter abnormality, a second function of storing the error code indicating the content of the abnormality in the backup RAM 44 or the nonvolatile memory 45 when the internal abnormality is detected, and a third function of executing a processing for being reset intentionally (e.g., a processing of stopping output of the WDP). In this case, when the microcomputer 25 determines "YES" at S110 in the start-up processing in FIG. 2, the microcomputer 25 may determine whether this start up is a start up after the intentional reset by the third function, and may skip S120 and S130 when the microcomputer 25 determines that this start up is a start up after the intentional reset.

The microcomputer 25 may acquire the time information from other device (other microcomputer or a circuit) included in the ECU 11. The monitoring circuit 31 may be other microcomputer. Only one of the power supply circuit 29 and the monitoring circuit 31 may have a function of monitoring the operation of the microcomputer 25.

A function of one component in the above-described embodiment may be distributed as functions of a plurality of components, or functions of a plurality of components in the above-described embodiment may be integrated as a function of one component. At least a part of the configuration of the above-described embodiment may be replaced by a known configuration having a similar function. A part of the configuration of the above-described embodiment may be omitted as long as a technical problem can be solved. At least a part of the configuration of each of the above-described embodiments may be added or replaced with respect to the configuration of other of the above-described embodiments. Other than the above-described ECUs, the present disclosure can be realized by various forms such as a system including one of the ECUs, a program executed by the microcomputer of one of the ECUs, a medium storing the program, and a method of storing information for analyzing the cause of the reset of the microcomputer.

What is claimed is:

1. An electronic control unit comprising:
a microcomputer including an acquisition section, a determination section, and a time calculation section; and
a monitoring section monitoring an operation of the microcomputer and outputting a reset signal to the microcomputer when the monitoring section determines that an abnormality occurs in the microcomputer, wherein
the acquisition section acquires time information from outside the microcomputer,
when the microcomputer starts up, the determination section determines whether the microcomputer stopped the operation due to unknown cause; and
when the determination section determines that the microcomputer stopped the operation due to unknown cause, the time calculation section calculates stop time information that indicates a time during which the microcomputer stopped the operation based on the time information acquired by the acquisition section before the microcomputer stopped the operation and the time information acquired by the acquisition section after the microcomputer starts up, and stores the stop time information in a time storage portion, wherein
when a power supply switch is turned on, the microcomputer is supplied with a power supply voltage and starts up,
when the microcomputer detects that the power supply switch is turned off, the microcomputer stops the operation,
the microcomputer further includes a history storage section,
the history storage section periodically determines, as a determination result, whether the power supply switch is on or off and stores history information that indicates the determination result in a history storage portion,
when the microcomputer starts up, the determination section determines whether the history information stored in the history storage portion indicates that the power supply switch is on, and when the history information indicates that the power supply switch is on, the determination section determines that the microcomputer stopped the operation due to unknown cause.

2. An electronic control unit comprising:
a microcomputer including an acquisition section, a determination section, and a time calculation section; and
a monitoring section monitoring an operation of the microcomputer and outputting a reset signal to the microcomputer when the monitoring section determines that an abnormality occurs in the microcomputer, wherein
the acquisition section acquires time information from outside the microcomputer,
when the microcomputer starts up, the determination section determines whether the microcomputer stopped the operation due to unknown cause; and
when the determination section determines that the microcomputer stopped the operation due to unknown cause, the time calculation section calculates stop time information that indicates a time during which the microcomputer stopped the operation based on the time information acquired by the acquisition section before the microcomputer stopped the operation and the time information acquired by the acquisition section after the microcomputer starts up, and stores the stop time information in a time storage portion,
wherein
the microcomputer further includes a prohibition section, and
when the stop time information is calculated by the time calculation section, the prohibition section prohibits an operation of the time calculation section until a number of times of the microcomputer normally stopping the operation becomes equal to or greater than a predetermined number of times.

3. The electronic control unit according to claim 2, wherein
the microcomputer further includes a prohibition invalidation section, and
the prohibition invalidation section determines whether a time indicated by the stop time information calculated by the time calculation section is equal to or less than a predetermined value, and when the time is not equal to or less than the predetermine value, the prohibition invalidation section invalidates a function of the prohibition section.

* * * * *